No. 739,763. PATENTED SEPT. 22, 1903.
G. E. WATSON.
HORSESHOE.
APPLICATION FILED FEB. 12, 1903.
NO MODEL.
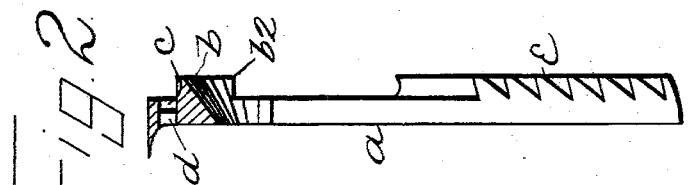
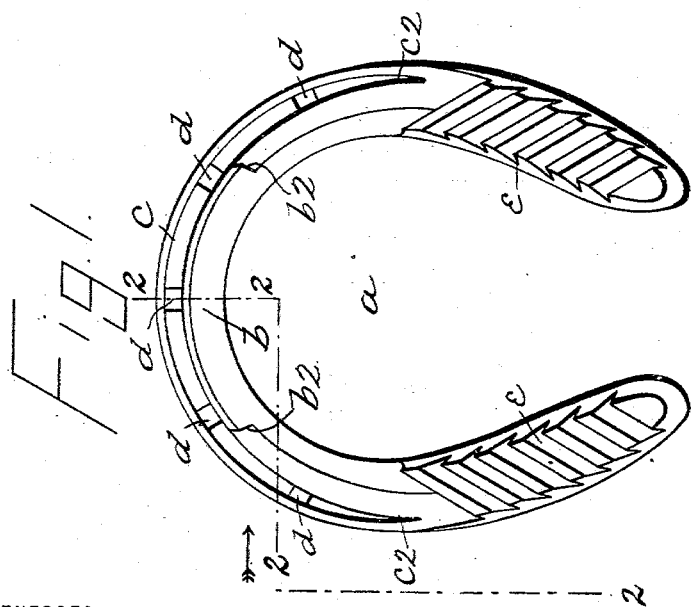
WITNESSES
J. C. Larsen
F. A. Stewart
INVENTOR
George E. Watson
BY
Edgar Tate & Co
ATTORNEYS No. 739,763.

Patented September 22, 1903.

UNITED STATES PATENT OFFICE.

GEORGE E. WATSON, OF BROOKLYN, NEW YORK.

HORSESHOE.

SPECIFICATION forming part of Letters Patent No. 739,763, dated September 22, 1903.

Application filed February 12, 1903. Serial No. 143,037. (No model.)

*To all whom it may concern:*

Be it known that I, GEORGE E. WATSON, a citizen of the United States, residing at Brooklyn, in the county of Kings and State of New York, have invented certain new and useful Improvements in Horseshoes, of which the following is a specification, such as will enable those skilled in the art to which it appertains to make and use the same.

The object of this invention is to provide a horseshoe having calks so formed that a horse provided therewith will not slip on frozen ground and streets or on asphalt pavements or other smooth roads or streets; and with this and other objects in view the invention consists in a horseshoe constructed as hereinafter described and claimed.

The invention is fully disclosed in the following specification, of which the accompanying drawings form a part, in which the separate parts of my improvement are designated by suitable reference characters in each of the views, and in which—

Figure 1 is a bottom plan view of a horseshoe made according to my invention; and Fig. 2, a sectional side view thereof, the section being on the line 2 2 of Fig. 1.

In the practice of my invention I provide a horseshoe $a$ of the usual general form, but the toe portion of which is provided at the bottom thereof with a segmental calk $b$, which occupies the space between the points $b^2$; but the length of this calk may be varied as may be desired, and around the calk $b$ the toe portion of the shoe is provided with a groove $c$, which extends backwardly to a point about midway of each side of the shoe, as indicated at $c^2$, and in this groove the nail-holes $d$ are formed.

The rear or heel portion of the sides of the shoe are provided with a number of transverse teeth $e$, which form the heel-calks and which are preferably arranged diagonally, as clearly shown in the drawings, the inclination being forwardly and outwardly. This inclination of the heel-calks, however, may be changed within broad limits without departing from the spirit of the invention or sacrificing its advantages.

As shown in the drawings, the heel calks or teeth $e$ and the toe-calk $b$ are beveled forwardly and are somewhat blunt at their bearing points or edges; but all of said calks may be made sharp, if desired, and while I prefer the inclination shown the said calks may be beveled or inclined on both sides, if desired.

As thus made it will be seen that all the rear portions of the sides of the shoe are provided with calks, and as thus made the shoe will not slip on frozen or other slick surfaces, and a horse provided with shoes made in this way will be able to retain his footing under almost all conditions, whether traveling on ice, frozen ground, or slippery asphalt pavements.

My invention is not limited to the exact shape and inclination of the heel calks or teeth $e$, and various changes in the form of these teeth or calks may be made without departing from the spirit of my invention or sacrificing its advantages.

Having fully described my invention, what I claim as new, and desire to secure by Letters Patent, is—

A horseshoe the heel portions of the sides of which are provided with a plurality of transverse teeth or calks arranged diagonally, and the toe portion of which is also provided with a toe-calk which is segmental in form and around which is formed a groove in which the nail-holes are formed, substantially as shown and described.

In testimony that I claim the foregoing as my invention I have signed my name, in presence of the subscribing witnesses, this 11th day of February, 1903.

GEORGE E. WATSON.

Witnesses:
J. C. LARSEN,
F. A. STEWART.